July 10, 1923.
H. R. SOLINGER ET AL
1,461,502
CURRENT MOTOR
Filed Feb. 15, 1922
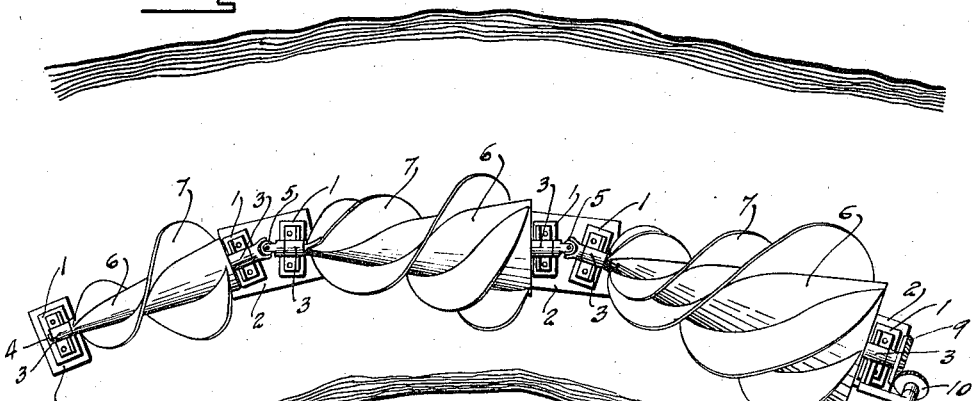
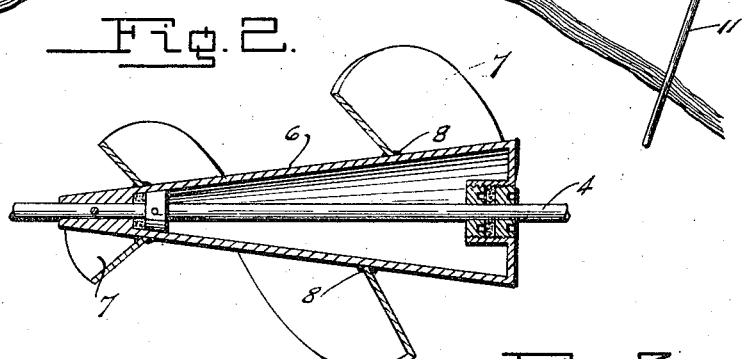
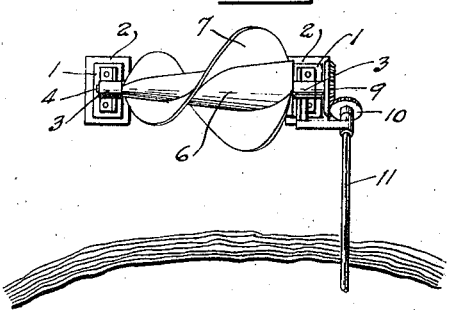
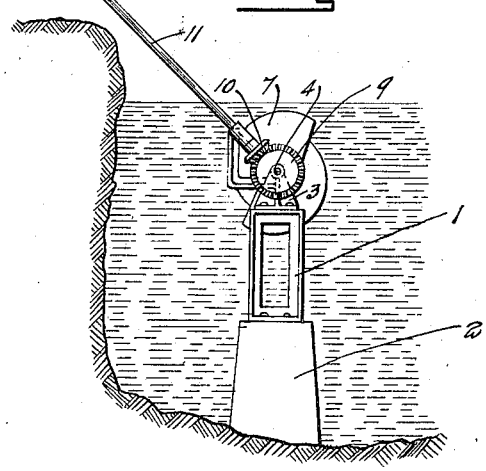
Inventors
Henry R. Solinger
Ernest G. Messer
By Watson E. Coleman
Attorney Patented July 10, 1923.

1,461,502

UNITED STATES PATENT OFFICE.

HENRY R. SOLINGER AND ERNEST G. MESSER, OF ZILLAH, WASHINGTON, ASSIGNORS TO SOLINGER POWER COMPANY, OF ELMA, WASHINGTON, A CORPORATION OF WASHINGTON.

CURRENT MOTOR.

Application filed February 15, 1922. Serial No. 536,688.

*To all whom it may concern:*

Be it known that we, HENRY R. SOLINGER and ERNEST G. MESSER, citizens of the United States, residing at Zillah, in the county of Yakima and State of Washington, have invented certain new and useful Improvements in Current Motors, of which the following is a specification, reference being had to the accompanying drawings.

The present invention has for its purpose the provision of a current motor or power wheel, which may be used either in a dam, or in a current, or employed as a wind wheel upon windmills, it being noted that the body or drum of the wheel is conical, and constructed airtight, to insure that the wheel may operate with considerable ease, thereby producing power of a substantial degree, for the purpose of lifting and pumping water, and for operating various machinery.

Another purpose is the provision of a wheel of this character consisting of a conical airtight body, which has been found to add strength to the wheel, and will enable the wheel to operate freely, and thereby produce a substantial degree of power. This is particularly so, due to the body being conical, allowing the current of water to more easily pass between the helical blades, than if the body should be of cylindrical shape.

A still further purpose is the provision of a wheel of this kind, wherein bolts or like fastening means are not used for fastening the blades to the body of the wheel, thereby obviating the loss of such bolts. In fact the helical blades may be brazed, welded, or spot welded to the body, or riveted. In this way the blades are held firm and rigid, and furthermore there is no possibility of the sections of the wheel coming apart or disconnecting. Furthermore being that there are no bolts used, drifts, trash or other foreign matter is prevented from clinging to the wheel.

Still another purpose is the provision of a wheel of this character, which obviates the use of a body which is square in cross section, or cylindrical shaped. Being that the body is conical shaped, the wheel is prevented from churning the water, which would otherwise be accomplished, should the body be made square in cross section, or cylindrical.

While the design and construction at present illustrated and set forth are deemed preferable, it is obvious that as a result of a reduction of the invention to a more practical form for commercial purposes, the invention may be susceptible of changes and the right to these changes is claimed, provided they are comprehended within the scope of what is claimed.

The invention comprises further features and combination of parts, as will be hereinafter set forth, shown in the drawings and claimed.

In the drawings:—

Figure 1 is a view showing a plurality of power wheels coupled together, and located in a stream of water, showing the shaft of one of the wheels provided with a bevel gear, whereby power may be transmitted to other sources;

Figure 2 is a longitudinal sectional view through one of the wheels;

Figure 3 is a view showing a single power wheel located in a stream of water; and Figure 4 is an end view of Figure 3.

Referring to the drawings, 1 designates a suitable frame, which is constructed of any suitable material preferably angle iron, bars and the like, and which is built on the bed of a stream of water. In fact a suitable foundation of masonry or stone work 2 is constructed on the bed of the stream, and mounted upon the stone work is a frame, in bearings 3 of which the shafts 4 of the power wheels are mounted. The shafts are coupled together by universal joints 5, thereby enabling the shafts to be arranged at angles to each other, in order to conform to the contour of the stream, and yet permit the wheels to rotate.

It will be noted that the bodies or rotors 6 of the various wheels are conical, enabling the water to very easily pass between the various helical blades 7, which are brazed, welded or spot welded as at 8 to outer surfaces of the bodies. Obviously, the larger the bodies, the more blades. However for illustrative purposes, it will be noted that one wheel has two blades, while the others have three and four blades. In this instance, the body of the wheel which has two blades is relatively smaller, while the bodies of the other two wheels are increased in size. In fact the body which has the four blades is the largest of the series illustrated, while the body which has three blades is the size intermediate the largest and the smallest.

It will be noted that the bodies of the various wheels may be constructed airtight, or open, or solid, preferably airtight and hollow.

One end of one of the shafts, nearest the bank of the stream is provided with a bevel gear 9, which meshes with a similar gear 10, which is carried by a counter-shaft 11, from which power may be transmitted to any suitable location, for operating various machinery, or to which a pump may be attached for pumping or lifting water, for irrigation and other purposes. Obviously a single wheel of the present character may be used on windmills, for imparting power to the pump or rod. It will be noted that by the provision of a device of this kind, no lost motion or back pressure exist, and since the body is constructed airtight and conical, the wheel has the advantage of others, in that its pulling power is equal throughout the length of the wheel, which is rotated with greater ease, since the stream of water may easily conform to and pass over the tapered surface of the body and between the various blades.

The preferred construction of the wheel, as shown in Figure 2, consists in providing the rotor 6 in the form of a hollow cone with the shaft 4 extending axially therethrough, the opening in the smaller end of the cone being of a size to snugly receive the shaft and said smaller end being solid to present an annular internal shoulder 15. A packing 16 surrounds the shaft and engages this shoulder at one side, while the opposite side of the packing is engaged by a tapered collar 17 pinned on the shaft. The end wall of the cone at its larger end is provided with an inwardly projecting internally threaded flange 18 whose internal diameter is sufficiently larger than the external diameter of the collar 17 as to admit the latter therethrough when the parts are assembled. A pair of packing glands are threaded into the flange 18 as at 19 and have central openings through which shaft 4 extends, a packing 20 being disposed between the glands. A pin 21 passes through the shaft and the solid smaller end of the cone to secure the latter to the shaft. By means of this construction, the water is excluded from the interior of the rotor in a simple and efficient manner.

The invention having been set forth, what is claimed is:—

1. In a current motor, a plurality of supports carrying bearings, shafts journaled through said bearings and operatively connected, a power take-off device at one end of the series of shafts, and a conical rotor on each shaft equipped with spirally arranged blades, said rotors being of progressively increasing diameters.

2. In a current motor, a plurality of supports carrying bearings, shafts journaled through said bearings and operatively connected, a power take-off device at one end of the series of shafts, and a conical rotor on each shaft equipped with spirally arranged blades, said rotors being of progressively increasing diameters, the rotors being arranged with their smaller ends up-stream and the series being arranged with the rotor of smallest diameter at the up-stream end.

In testimony whereof we hereunto affix our signatures.

HENRY R. SOLINGER.
ERNEST G. MESSER.